Jan. 25, 1938.	G. MELLEN ET AL	2,106,643
SIGNAL DEVICE
Filed June 4, 1936	2 Sheets-Sheet 1
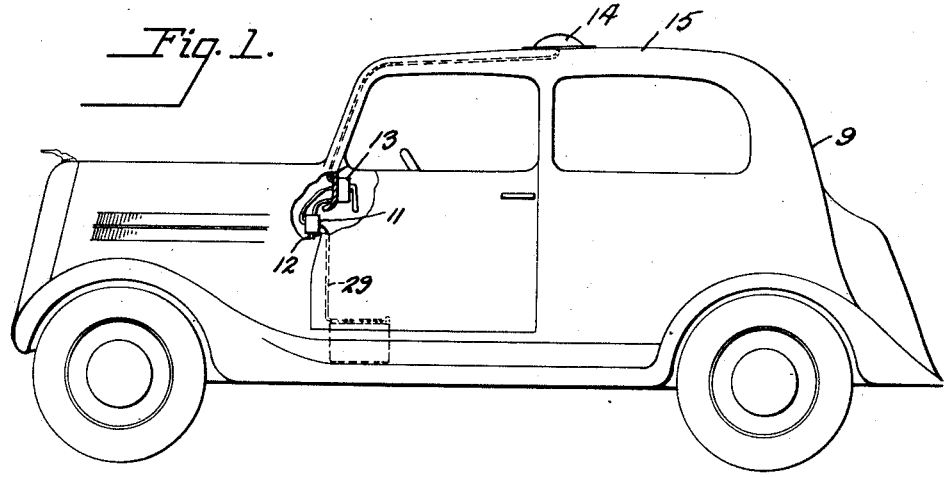
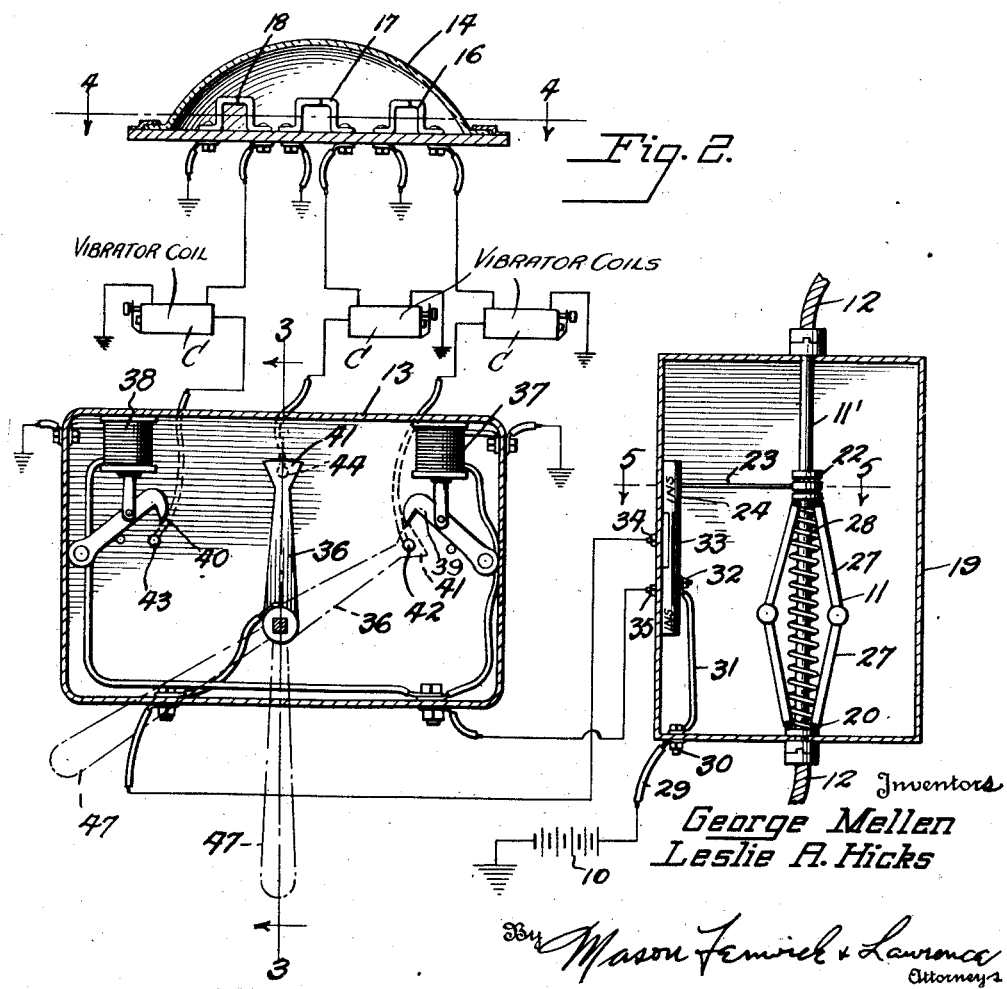
Inventors
George Mellen
Leslie A. Hicks
By Mason Fenwick & Lawrence
Attorneys Jan. 25, 1938. G. MELLEN ET AL 2,106,643
SIGNAL DEVICE
Filed June 4, 1936   2 Sheets-Sheet 2
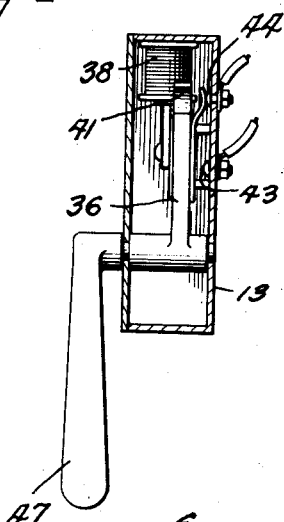
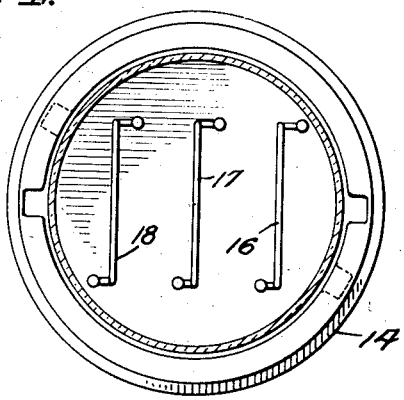
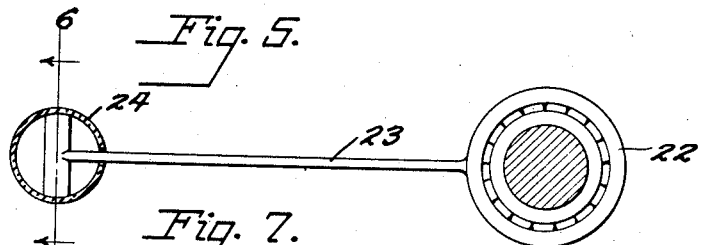
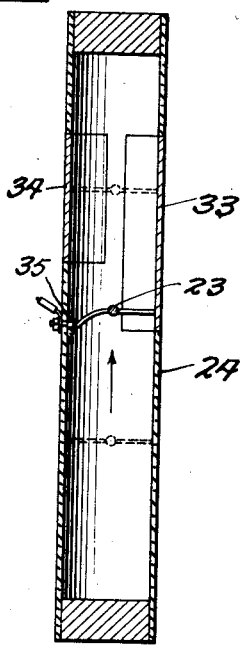
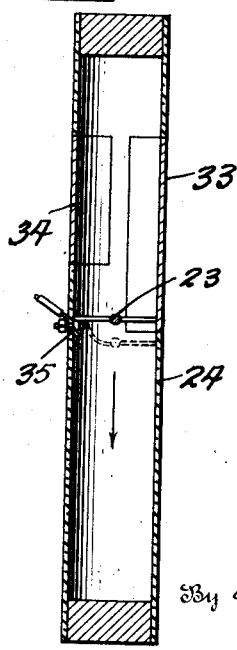
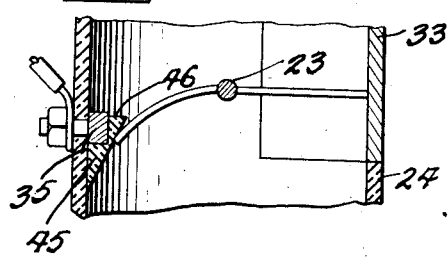
Inventors
George Mellen
Leslie A. Hicks Patented Jan. 25, 1938

2,106,643

UNITED STATES PATENT OFFICE 2,106,643

SIGNAL DEVICE

George Mellen, Diamond Head, and Leslie A Hicks, Honolulu, Territory of Hawaii

Application June 4, 1936, Serial No. 83,558

3 Claims. (Cl. 177—339)

This invention relates to direction indicators; and more particularly, one in which direction and stop indicators are combined.

One of the objections to the usual indicator resides in the necessity of operating the indicator at the time the turn is made, or setting it so far in advance as to lose its effectiveness. When the signal is given at the time of making the turn, the attention of the operator is diverted from the vehicle, and often a hand is removed from the wheel.

In our construction, the signal for a turn is manually set, but its operation is controlled entirely by the speed of the vehicle, it automatically operating when the speed reaches a certain point. Thus the signal may be manually set considerably prior to the turning operation, but will not operate until the vehicle slows for the turn. The same principle is invoked in connection with stopping of the vehicle, only no manual operation is necessary, the decreased speed of the vehicle automatically operating the signal. Upon the speed increasing to a previously selected point, the indicator will cease to operate and the manually operated member will automatically resume a neutral position ready for its next manual setting. In the drawings, a dome is shown mounted on top of the vehicle, the dome containing "neon" lights of different colors, each having a definite significance in connection with the operation of the vehicle.

The principal object of our invention is to provide means for causing indicators to operate after the initial indication has been manually operated, the actual operation to be controlled by the speed of the vehicle.

Another object is to provide means for automatically restoring the mechanism of the indicator to a neutral position after the signal has been given.

Still another object is to provide direction and stoppage indicators all controlled by the speed of the vehicle.

Other objects will become apparent as the detailed description thereof proceeds.

In the drawings:

Figure 1 is a side elevation of a motor vehicle, partly broken away, to illustrate the positioning of the signalling apparatus in relation to the vehicle;

Figure 2 is a vertical section of the apparatus removed from the vehicle showing the circuits;

Figure 3 is a detail of the manual control in vertical section taken on the line 3—3 of Figure 2;

Figure 4 is a horizontal section of the signal showing the "neon" tubes, taken on the line 4—4 of Figure 2;

Figure 5 is a horizontal section, in detail, taken on the line 5—5 of Figure 2;

Figure 6 is an enlarged detail in vertical section, taken on the line 6—6 of Figure 5;

Figure 7 is a view, similar to Figure 6, showing the contact member in circuit caused by the increase in speed after the turn has been made; and Figure 8 is an enlarged detail of the contact shown in Figure 6 as it is moved upward due to decrease in speed prior to a turn being made.

Referring to the drawings, in which similar parts are designated by like numerals:

Numeral 9 designates a motor vehicle of the usual type having a battery 10, a fly-ball governor 11 placed on the speedometer cable 12, a control box 13, and a dome-shaped light casing 14 on the top 15 of the vehicle 9.

In the dome 14 "neon" tubes of different colors are placed, 16 indicating the color green, 17 the color orange, and 18 the color red. These colors are arbitrarily selected; red indicates a left turn, green a right turn, and orange "stop". The governor 11 is mounted in a housing 19, the lower end 20 of the governor 11 being fixed to a rod 11' rotatably mounted in said housing and fixed at its lower end to the cable 12, the upper end 21 having a ball bearing guide 22 slidably mounted on the rod 11', with a contact member 23 extending from the ball bearing guide 22, and adapted to slide in a tube 24, as shown in Figures 5, 6, and 7 and 8. Tube 24 contains contact members 34 and 35. The fly-ball governor 11 is of the usual construction, rotating with the cable 12, and upon the speed of rotation increasing which, of course, is in proportion to the speed of the vehicle, the arms 27 of the governor 11 will be forced outwardly, thus lowering the ball bearing guide 22, carrying the contact member 23, and conversely the arms 27 will be drawn in upon the speed of the vehicle decreasing, and in turn the contact member 23 will be raised.

Mounted on the rod 11' between the upper end 21 and lower end 20 of the governor 11, is a coil compression spring 28 which will normally keep the governor 11 extended. Extending from the battery 10 is a wire 29 connected to a terminal 30 located in the bottom of the housing 19 and extending therefrom to another wire 31 connecting a terminal 32 positioned in the tube 24, and in turn, connected to a long, flat plate 33.

On the opposite side of the tube 24 are contact members 34 and 35 separated from each other and plate 33 by insulation. The contact 34 is connected to control lever 36 mounted on a control panel P, and contact member 35 is connected to the solenoids 37 and 38. Hooks 39 and 40 are pivotally connected to the solenoids 37 and 38 and adapted to catch and hold the end 41 of lever 36 upon the same being rotated either to the left or right.

Directly beneath each solenoid are contacts 42 and 43; and between these contacts is a contact 44. Contact 42 is connected to "neon" tube 16, and contact 44 to "neon" tube 17, and contact 43 to "neon" tube 18. Vibrator coils C are interposed in the circuits between said contacts and the tubes to step up the voltage sufficiently to effect operation of the tubes.

As actually operated, the operator desiring to make a right hand turn will rotate the lever 36 from a position of rest in contact with the contact 44 past the hook 39, which will be raised as the lever 36 passes by, until said lever rests on contact 42. The hook 39 immediately resumes its former position, locking the end 41 in place on contact 42. Usually the vehicle will be proceeding at a speed above twenty miles per hour, and under such conditions, the governor 11 will be lowered sufficiently to cause contact member 23 to be below the contact member 35. It will be noted that contact member 35 has on its inner face, as shown in Figures 6, 7 and 8, a triangular block 45 of insulation material being recessed to receive the contact of the terminal 35. As the speed of the vehicle decreases, the governor 11 will rise, likewise raising contact member 23 which will ride over the block 45, thus escaping the upper face 46, and continuing to rise until contact is made with contact member 34. Since the contact member 23 is already in contact with plate 33, the circuit is completed, and the lever 36, which is resting on contact 42, will carry the current to the "neon" tube 16, thus causing a green light. This indicates a right turn. It is obvious that the "neon" tube will not be energized until the speed of the vehicle has decreased sufficiently to cause the contact member 23 to contact the member 34. The lever 36 may be turned at any time previous thereto without giving a signal. As soon as the turn has been completed and the vehicle accelerated, the contact member 23 will fall, contacting the face 46 of the block 45, thus breaking the circuit connected to the "neon" light and energizing the solenoid 37, which will raise the hook 39, releasing the handle or lever 36, causing it to assume a vertical position on the contact 44.

When a left hand turn is desired, the lever 36 will rotate to a position on contact 43, and the same operation follows only a red light will result instead of green, the "neon" tube 18 being energized, and the circuit being broken upon speed being increased until the solenoid 38 is energized and the lever 36 released to assume its position of rest. It is to be noted that the lower end 47 of the lever 36 is longer and heavier than the upper end 41, and thus will always assume the vertical when released. As long as the lever 36 is on contact 44, a "stop" signal will be given upon the acceleration being curtailed to a point to cause the contact member 23 to contact the member 34. As the acceleration continues to drop, the contact member 23 will continue to rise until it passes beyond the contact 34, when no signal will be given. When the vehicle comes to a complete stop, the spring 28 will cause the governor 11 to be extended and all signals disconnected.

The contacts 34 and 35 are so positioned in relation to the contact member 23 carried by the governor 11 that a definite range of speeds may be selected. For example, as long as the vehicle is operating in excess of twenty miles per hour, no signal will be given, the contact member 23 being below the contact members 34 and 35. Upon the speed being decreased to fifteen miles an hour, the contact member will have reached the plate 33 and will be in contact with contact member 34 from fifteen to five miles per hour to give a "stop" signal; below five miles an hour, no signal will be given. At a speed lower than five miles per hour, no signal will be given it not being deemed necessary since the vehicle will be moving at such a slow rate of speed that there is little danger of accident, the proper signal having previously been given. It is also necessary that all signals be discontinued by the time the vehicle comes to rest.

Obviously, our invention is not limited to the use of a visual signal, as signals other than visual can be used. We have in mind, also the use of our device, with slight modifications, to indicate rates of speed which would indicate by different colored lights, ranges of speed, the control being sealed by the proper authorities.

Numerous variations may doubtless be devised by persons skilled in the art without departing from the principles of our invention. We, therefore, desire no limitations to be imposed on our invention, except such as are indicated in the appended claims.

What we claim is:

1. The combination with a vehicle, a pair of electrically operable direction indicating signals mounted thereon in locations visible to pedestrians and drivers of other vehicles, a control panel for said signals including a pair of contacts electrically connected, one to each signal, a source of electrical energy, a circuit maker and breaker connected to said source, a switch lever pivoted on said panel to swing into contact with either of said contacts and electrically connected to said circuit maker and breaker, means for locking said switch lever in contact with either of said contacts when the lever is in contacting position therewith, means operably connected to the vehicle and movable in accordance with the speed of the vehicle to close the circuit from said source through said circuit maker and breaker and said switch lever and the signal having its control contact in contact with said lever, said circuit maker and breaker closing either signal circuit between predetermined upper and lower limits of vehicle speed only, and means operable by the circuit closing means to release said locking means when the speed of the vehicle rises beyond said upper limit to a predetermined higher speed.

2. The combination with a vehicle, a plurality of electrically operated direction indicating signals mounted thereon in locations visible to pedestrians and drivers of other vehicles, a control panel for said signals including a plurality of contacts, one for each signal electrically connected thereto to control the operation thereof, a switch lever adapted to be set manually in contact with one of said contacts, a source of electrical energy, means including a circuit maker and breaker connecting said source to said switch, and mechanism operably connected to said vehicle and movable in accordance with the speed thereof to close the circuit through said maker and breaker and said switch and any of the signals electrically connected therewith while the vehicle is moving between predetermined upper and lower limits of speed.

3. The combination with a vehicle, a plurality of electrically operated direction indicating signals mounted thereon in locations visible to pedestrians and drivers of other vehicles, a control panel for said signals including a plurality of contacts, one for each signal and electrically connected thereto to control the operation thereof, a switch lever adapted to be set manually in contact with any of said contacts, a source of electrical energy, a circuit maker and breaker connecting said source to said switch and including mechanism operably connected to said vehicle and movable in accordance with the speed thereof to close the circuit through said switch and any of the signals electrically connected therewith while the vehicle is moving between predetermined upper and lower limits of speed, means for locking said switch in contact with any of said control contacts, and means operable by said mechanism for releasing said locking means when the speed of the vehicle rises to a predetermined speed higher than said upper limit.

GEORGE MELLEN.
LESLIE A. HICKS.